United States Patent
Nagakura et al.

(10) Patent No.: US 7,681,447 B2
(45) Date of Patent: Mar. 23, 2010

(54) LIQUID LEVEL DETECTION APPARATUS

(75) Inventors: Syunsuke Nagakura, Shizuoka (JP); Toshio Ohike, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 201 days.

(21) Appl. No.: 12/036,052

(22) Filed: Feb. 22, 2008

(65) Prior Publication Data
US 2008/0141771 A1    Jun. 19, 2008

Related U.S. Application Data

(62) Division of application No. 11/186,939, filed on Jul. 22, 2005, now Pat. No. 7,350,413.

(30) Foreign Application Priority Data
Jul. 22, 2004    (JP)    ............................. 2004-213989

(51) Int. Cl.
*G01F 23/32*    (2006.01)
(52) U.S. Cl. .............................. 73/317; 73/313; 73/305
(58) Field of Classification Search .................. 73/317, 73/313, 305, 290 R
See application file for complete search history.

(56) References Cited

U.S. PATENT DOCUMENTS
6,021,668 A    2/2000    Sawert et al.

FOREIGN PATENT DOCUMENTS

| DE | 24 04 543 C3 | 9/1975 |
|---|---|---|
| DE | 33 30 871 C3 | 3/1984 |
| EP | 0 493 339 A1 | 7/1992 |
| EP | 1 291 624 A2 | 3/2003 |
| JP | 2-38704 U | 3/1990 |
| JP | 2004-61420 A | 2/2004 |

OTHER PUBLICATIONS

Japanese Office Action dated Feb. 17, 2009.

*Primary Examiner*—Hezron Williams
*Assistant Examiner*—Rodney T Frank
(74) *Attorney, Agent, or Firm*—Sughrue Mion, PLLC

(57) ABSTRACT

A liquid level detection apparatus of the present invention includes contacts provided at a distal end portion of a contact plate, and resistance plates which are formed on a wiring board, and have respective conductor portions over which the contacts can slide, respectively, so as to detect a liquid level. Conductor patterns other than the conductor portions are formed on those regions of the wiring board which the contacts at the distal end portion of the contact plate contact during the time when an arm holder is mounted on the wiring board.

4 Claims, 5 Drawing Sheets

INSERTING DIRECTION OF CONTACT

LIQUID LEVEL DETECTION APPARATUS

CROSS-REFERENCE TO RELATED APPLICATIONS

This is a divisional of U.S. application Ser. No. 11/186,939 filed Jul. 22, 2005, the entire disclosure of which is considered part of the disclosure of the accompanying divisional application and is hereby incorporated by reference. This application claims priority from Japanese Patent Application No. 2004-213989, filed on Jul. 22, 2004, the entire content of which is incorporated herein by reference.

BACKGROUND OF THE INVENTION

1. Field of the Invention

This invention relates to a liquid level sensor having a float arm swingable in accordance with a liquid level, and more particularly to a liquid level detection apparatus which is suitably mounted on a fuel tank of a vehicle using a liquid (such as gasoline or gas oil) as fuel, and detects a residual amount of the fuel.

2. Related Art

A conventional liquid level detection apparatus, having a structure shown in FIGS. 6 to 9, is commonly used (see JP-A-2004-061420 (FIGS. 8 to 10)).

As shown in FIG. 6, the conventional liquid detection apparatus 91A comprises a resin-molded frame 92, a metallic float arm 93, a resin-molded arm holder 94, contact plates 95, a float which has buoyancy relative to a liquid to be measured, and is mounted at a distal end portion of the float arm 93, and a circuit board 97 having a resistance plate mounted thereon.

One end portion of the float arm 93 which serves as a rotation shaft portion 93a is passed through a mounting hole 94a in the arm holder 94, and is rotatably inserted in amounting hole 92a formed in the frame 92.

A distal end portion of the rotation shaft portion 93a is fitted in an annular projecting portion 96 formed on and projecting downwardly from a lower side of the frame 92. The arm holder 94 is mounted on the frame 92 so as to rotate or swing around an axis of the rotation shaft portion 93a. The float is mounted on the other end portion (that is, the distal end portion) of the float arm 93.

The contact plates 95, fixed to the arm holder 94, have resiliency, and contacts 95, provided respectively at distal end portions of the contact plates 95, are urged by the resiliency into contact respectively with conductor portions 97a (see FIG. 9) mounted on the frame 92.

As shown in FIG. 7, the two contact plates 95 are arranged adjacent to each other in a forward-rearward direction. The first contact plate 95 and the second contact plate 95 are held in contact respectively with the conductor portions 97a provided on the circuit board 97.

As shown in FIG. 8, each contact 95a includes a lower portion 98 of a larger diameter, and an upper portion 99 of a smaller diameter, and an annular groove 100 is formed between the lower portion 98 and the upper portion 99. This annular groove portion 100 is fitted in a hole formed through the contact plate 95. A lower surface of the lower portion 98 is adapted to contact the conductor portion 97a.

The liquid level detection apparatus 91A is mounted on a container or vessel for storing a liquid, and when the float moves upward or downward in accordance with a change in the liquid level, the float arm 93 is swung around the axis of the mounting hole 92a within a predetermined angle range.

In accordance with this swing movement, the contact 95a on each contact plate 95 slides over the conductor portion 97a, with its lower portion 98 held in sliding contact with the conductor portion 97a, so that a resistance value between one end of the conductor portion 97a and the contact 95a on the contact plate 95 changes in a sensor circuit (not shown). This resistance change is detected by a sensor circuit, thereby obtaining a level signal representative of the amount of change of the liquid level.

As shown in FIG. 9, in the conventional liquid level detection apparatus 91A, when the contact plate 95 is to be mounted on the frame 92, the contact plate 95 is inserted in a direction of an arrow in FIG. 9. In this inserting operation, the contacts 95a, while rubbing an insertion region 99 (indicated by hatching in FIG. 9) of the ceramics board, are inserted respectively into predetermined positions.

In the above conventional liquid level detection apparatus 91A, however, when the contact plates 95 are to be mounted on the frame 92, the contacts, while rubbing the ceramics board, are brought into the predetermined positions because of the structure of the parts. Generally, each contact 95a is made of a silver alloy, and is lower in hardness than a ceramics material, and therefore when the contact rubs the ceramics material, there have been encountered problems that the surface of the contact takes scratches and that the surface of the contact reacts with moisture in the air, and is ionized to be deteriorated (an ion migration phenomenon).

And besides, the scratches on the contact surface temporarily cause a contact failure of the contact, so that the output value becomes unstable. Therefore, the conductor is affected by the contact failure of the contact, and an indication of a fuel gauge becomes inaccurate, which has invited a problem that the operation of the vehicle on which the fuel gauge is mounted is affected.

SUMMARY OF THE INVENTION

This invention has been made in view of the above problems, and an object of the invention is to provide a liquid level detection apparatus which can provide a simple structure by which contacts are prevented from being damaged when mounting a contact plate on a frame, thereby preventing the detection accuracy from being lowered.

1) A liquid level detection apparatus comprising a float arm which includes a swing portion for swing around an axis of its rotation shaft portion, and has a float mounted on a distal end portion thereof; an arm holder which holds the float arm, and enables the float arm to be swung around the axis of the rotation shaft portion; a contact plate which is fixed to the arm holder, and is operatively associated with the swing portion of the float arm; a contact provided at a distal end portion of the contact plate; and a resistance plate which is formed on a wiring board, and has a conductor portion over which the contact can slide so as to detect a liquid level; characterized in that a conductor pattern formed other than the conductor portion is formed on that region of the wiring board which the contact at the distal end portion of the contact plate contacts during the time when the arm holder is mounted on the wiring board.

In the liquid level detection apparatus of the above construction, the conductor pattern formed other than the first-mentioned conductor portion is formed on part of the wiring board, and with this construction the contact at the distal end portion of the contact plate is prevented from coming into direct contact with the wiring board during the mounting of the arm holder on the wiring board. Therefore, the contact will not be damaged or deteriorated by the wiring board higher in hardness than the contact, and there can be provided the liquid level detection apparatus of high reliability.

2) In the liquid level detection apparatus, the conductor pattern may be formed along an inserting direction of the contact during the mounting of the arm holder.

The contact can be protected with the simple construction without the need for effecting a complicated change in the structure.

3) In the liquid level detection apparatus, gaps may be formed in the conductor pattern so that the contact will not come into contact with the wiring board during the mounting of the arm holder on the wiring board.

The material for forming the conductor pattern can be saved, and besides in the event that foreign matters such as dirt are deposited on the contact during the mounting operation, a foreign matter-removing effect can be achieved.

In the liquid level detection apparatus of the present invention, the conductor pattern formed other than the conductor portion is formed on that region of the wiring board which the contact at the distal end portion of the contact plate contacts during the time when the arm holder is mounted on the wiring board. Therefore, damage and deterioration of the contact by contacting engagement are positively prevented, and there can be provided the liquid level detection apparatus of high reliability.

In addition, the conductor pattern is formed along the inserting direction of the contact during the mounting of the arm holder, and therefore the contact can be protected with the simple construction without the need for effecting a complicated change in the structure.

Furthermore, the gaps are formed in the conductor pattern so that the contact will not come into contact with the wiring board during the mounting of the arm holder on the wiring board, and therefore the material for forming the conductor pattern can be saved, and besides in the event that foreign matters such as dirt are deposited on the contact during the mounting operation, the foreign matter-removing effect can be achieved.

DETAILED DESCRIPTION OF THE PREFERRED EMBODIMENTS

Figure 1:
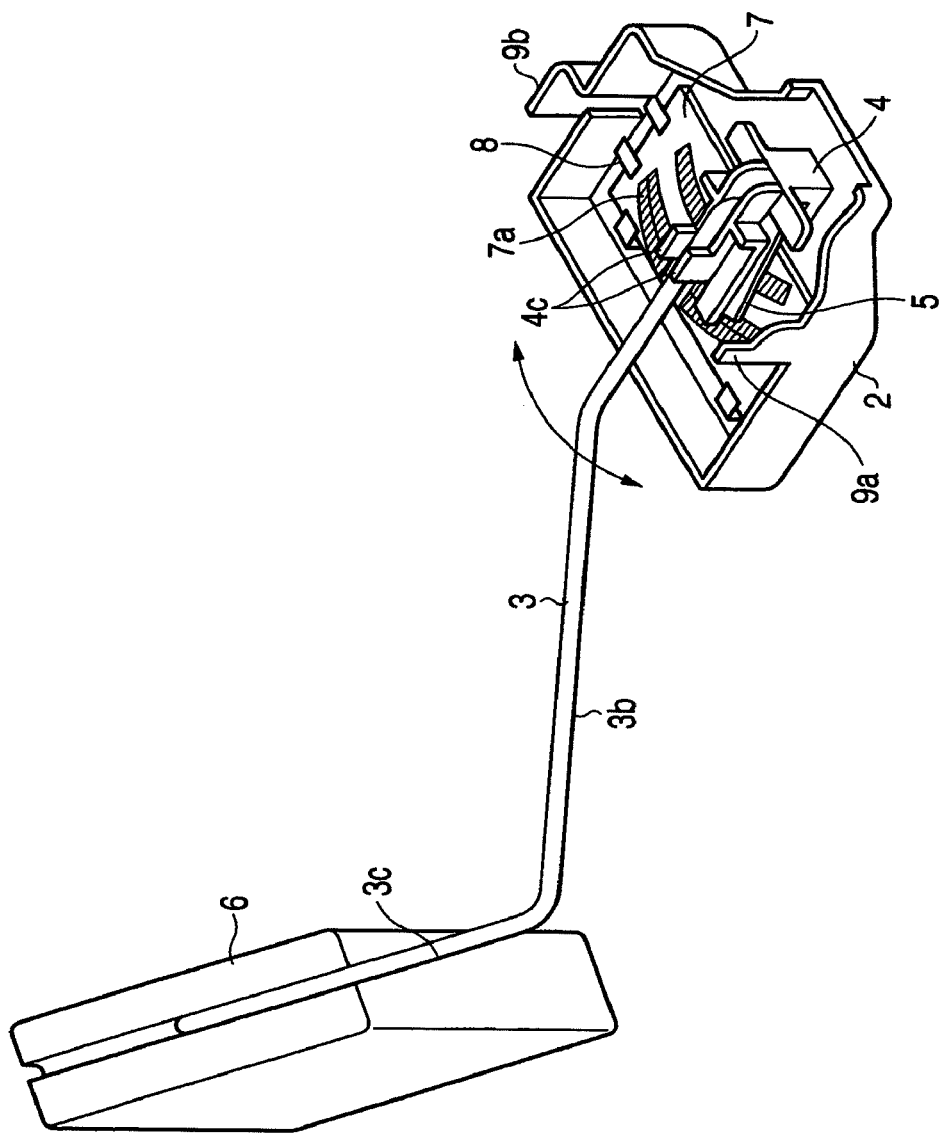
FIG. 1 is a perspective view showing one preferred embodiment of a liquid level detection apparatus of the present invention.

One preferred embodiment of a liquid level detection apparatus of the present invention will now be described in detail with reference to FIGS. 1 to 5. FIG. 1 is a perspective view showing one preferred embodiment of the liquid level detection apparatus of the invention, FIG. 2 is a cross-sectional view of an important portion of FIG. 1, and FIGS. 3 to 5 are plan views showing wiring boards, respectively.

As shown in FIG. 1, the liquid level detection apparatus 1 of this embodiment comprises a frame 2, a metallic float arm 3, an arm holder 4, a contact plate 5, a float 6 having buoyancy relative to a liquid to be measured, and the wiring board 7. The frame 2 is provided with an electric circuit for detecting a liquid level, the electric circuit comprising, for example, resistance plates 7a and 7b and output terminals 8 which will be described later.

Stoppers 9a and 9b are formed respectively at upper and lower edges of an open side of the frame 2, and each of the stoppers 9a and 9b has a predetermined length which is determined in view of the structure of the float arm 3.

Figure 2:
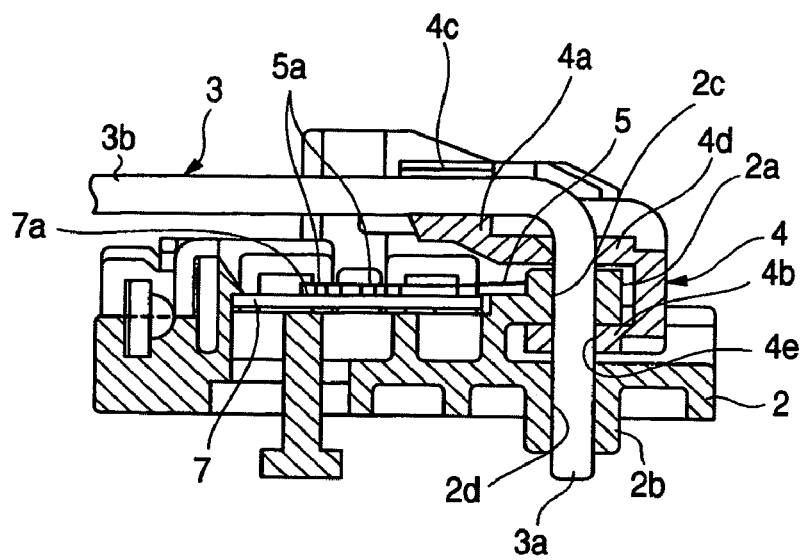
FIG. 2 is a cross-sectional view of an important portion of the liquid level detection apparatus of FIG. 1.

As shown in FIG. 2, a first bearing portion 2a is formed at the frame 2, and is disposed adjacent to a right end thereof, the first bearing portion 2a being part of the frame 2. A first bearing portion rotation shaft hole 2c is formed through the first bearing portion 2a, and a rotation shaft portion 3a of the float arm 3 is passed through this rotation shaft hole 2c. A second bearing portion 2b is formed at the frame 2, and is disposed beneath the first bearing portion 2a, and is spaced a predetermined distance from the first bearing portion 2a in generally parallel relation thereto, the second bearing portion 2b being part of the frame 2. A second bearing portion rotation shaft hole 2d is formed through the second bearing portion 2b, and is opposed to the first bearing portion rotation shaft hole 2c. The rotation shaft portion 3a is rotatably inserted into this rotation shaft hole 2c.

That portion of the frame, disposed between the first bearing portion 2a and the second bearing portion 2b, is formed into such a shape that a lower holding portion 4b of the arm holder 4 (described later) can be engaged with this portion. The float arm 3 is in the form of a single metallic rod, and includes the rotation shaft portion 3a serving as the axis of rotation, and a swing portion 3b which is bent at generally right angles relative to the rotation shaft portion 3a, and is swingable around the axis of the rotation shaft portion 3a. The float 6 of a rectangular parallelepiped shape, having buoyancy relative to the liquid to be measured, is mounted at a distal end portion of the swing portion 3b of the float arm 3.

The arm holder 4 supports the float arm 3, and is engaged with the frame 2 to hold the float arm 3 so as to cause the float arm 3 to be swung around the axis of the rotation shaft portion 3a. The arm holder 4 has a generally U-shaped cross-section, and includes an upper holding portion 4a and the lower holding portion 4b which are generally parallel to each other. The upper and lower holding portions 4a and 4b hold the first bearing portion 2a of the frame 2 therebetween in the upward and downward direction.

An upper holding portion rotation shaft hole 4d and a lower holding portion rotation shaft hole 4e are formed through the upper holding portion 4a and the lower holding portion 4b, respectively, in such a manner that the two holes 4d and 4e are opposed to each other. The rotation shaft portion 3a of the float arm 3 is rotatably received in the upper holding portion rotation shaft hole 4d and the lower holding portion rotation shaft hole 4e. Arm holding portions 4c of a claw-like shape are formed on an upper surface of the upper holding portion 4a, and the swing portion 3b of the float arm 3 can be press-fitted into a gap between the two arm holding portions 4c from the upper side, so that the arm holding portions 4c hold the press-fitted swing portion 3b.

The contact plate 5, fixed to the arm holder 4, has resiliency, and contacts 5a, provided at a distal end portion of the contact plate 5, are urged by the resiliency into contact respectively with the resistance plates 7a and 7b of the wiring board 7 mounted on the frame 2. An edge of an inner periphery of the upper holding portion rotation shaft hole 4d is chamfered, and the diameter of this rotation shaft hole 4d is decreasing gradually downwardly from the upper surface of the upper holding portion 4a such that the diameter of the rotation shaft hole 4d at the lower surface of the upper holding portion 4a is generally equal to the diameter of the rotation shaft portion 3a. Therefore, the rotation shaft portion 3a of the float arm 3 can be easily passed through the rotation shaft hole 4d, and the time, required for the assembling operation, is reduced.

Namely, in the assembling operation, the rotation shaft portion 3a of the float arm 3 is passed sequentially through the upper holding portion rotation shaft hole 4d, the first bearing hole 2c, the lower holding portion rotation shaft hole 4e and the second bearing portion rotation shaft hole 2d from the upper side. The swing portion 3b of the float arm 3 is press-fitted into the gap between the two arm holding portions 4c, and is held by these arm holding portions 4c.

In this condition, the lower surface of the first bearing portion 2a and the upper surface of the lower holding portion 4b abut against each other, and the withdrawal of the float arm 3 from the frame 2 is prevented by the passage of the rotation shaft portion 3a through the various shaft holes, the holding of the swing portion 3b by the arm holding portions 4c and the contact of the first bearing portion 2a with the lower holding portion 4b.

The above liquid level detection apparatus 1 is mounted on a container or vessel (not shown) for storing a liquid (such as gasoline) to be measured. When the float 6 moves upward or downwardly in accordance with a change in the liquid level, the float arm 3 is swung around the axis of the rotation shaft portion 3a within a predetermined angle range.

In accordance with this swing movement, the contact 5a on the contact plate 5 slides over the resistance plate 7a, and a resistance value between one end of the resistance plate 7a and the contact 5a of the contact plate 5 changes in the detection circuit. This resistance change is detected, and a level signal representative of the amount of change of the liquid level can be obtained from the output terminal 8.

Figure 3:
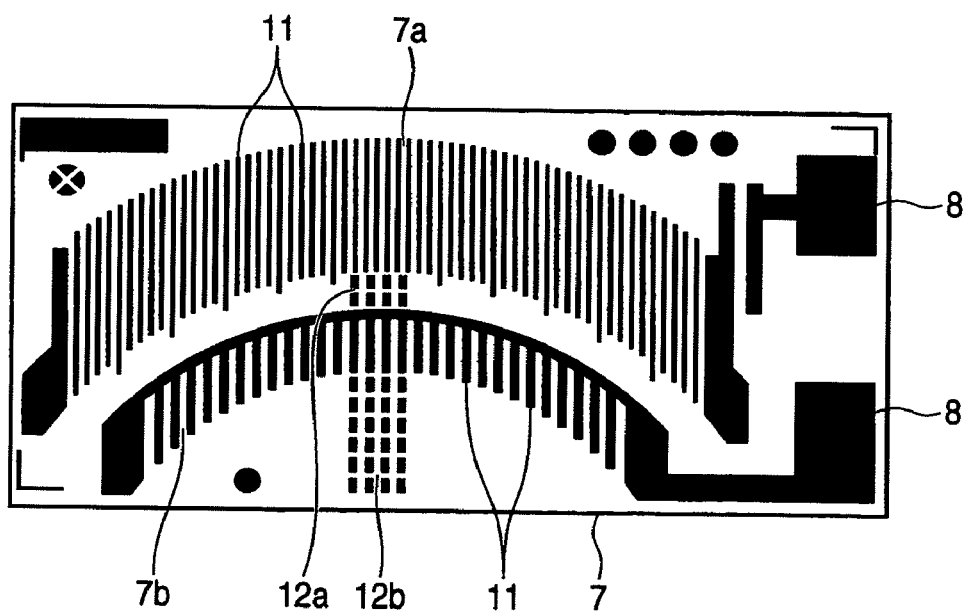
FIG. 3 is a plan view showing a wiring board of the liquid level detection apparatus of the invention.

As shown in FIG. 3, the wiring board 7 has resistance plates 7a and 7b (each having a conductor portion 11) provided thereon, and each contact 5a slides over the corresponding resistance plate 7a, 7b so as to detect a liquid level. Conductor patterns 12a and 12b other than the conductor portions 11 are formed on those regions of the wiring board 7 which the contacts 5a at the distal end portion of the contact plate 5 contact during the time when the arm holder 4 is mounted on the wiring board 7. The conductor pattern 12a is formed between the resistance plate 7a and the resistance plate 7b, while the conductor pattern 12b is formed at that side of the resistance plate 7b from which the contacts 5a are inserted.

The conductor patterns 12a and 12b are formed along the inserting direction of the contacts 5a during the mounting of the arm holder. The conductor patterns 12a and 12b are in the form of a mesh-like pattern formed by a plurality of generally spot-like conductor elements. The spot-like conductor elements are so sized and spaced from one another so that the contacts 5a will not come into direct contact with the wiring board 7 during the above mounting operation. With this arrangement, the amount of conductor paste used for forming the conductor patterns 12a and 12b can be reduced. And besides, in the event that foreign matters such as dirt are deposited on the contacts 5a during the mounting operation, a foreign matter-removing effect can be achieved.

Figure 4:
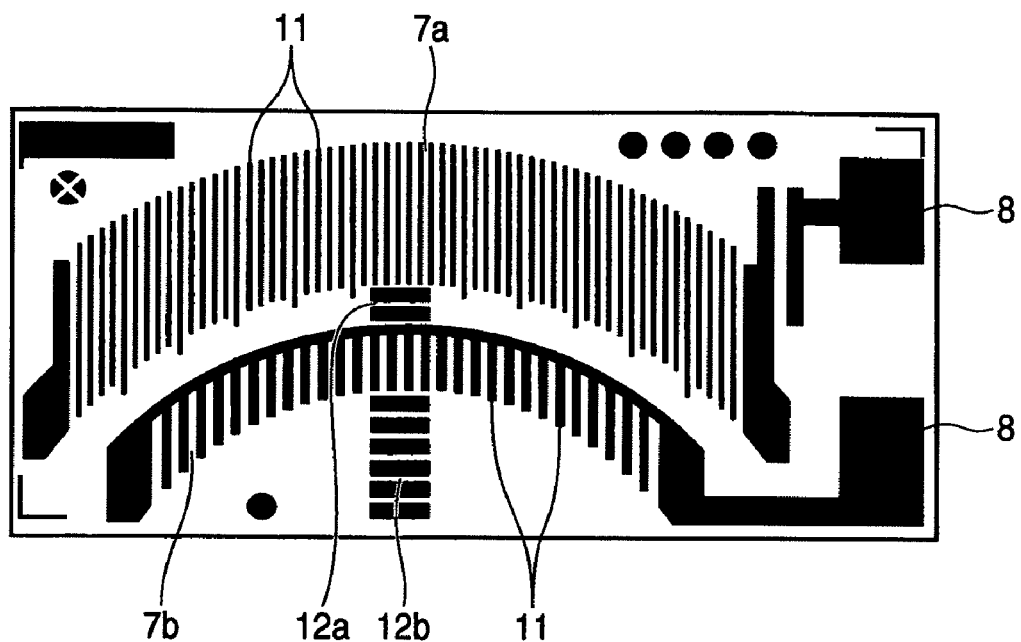
FIG. 4 is a plan view showing a modified wiring board of the liquid level detection apparatus of the invention.
Figure 5:
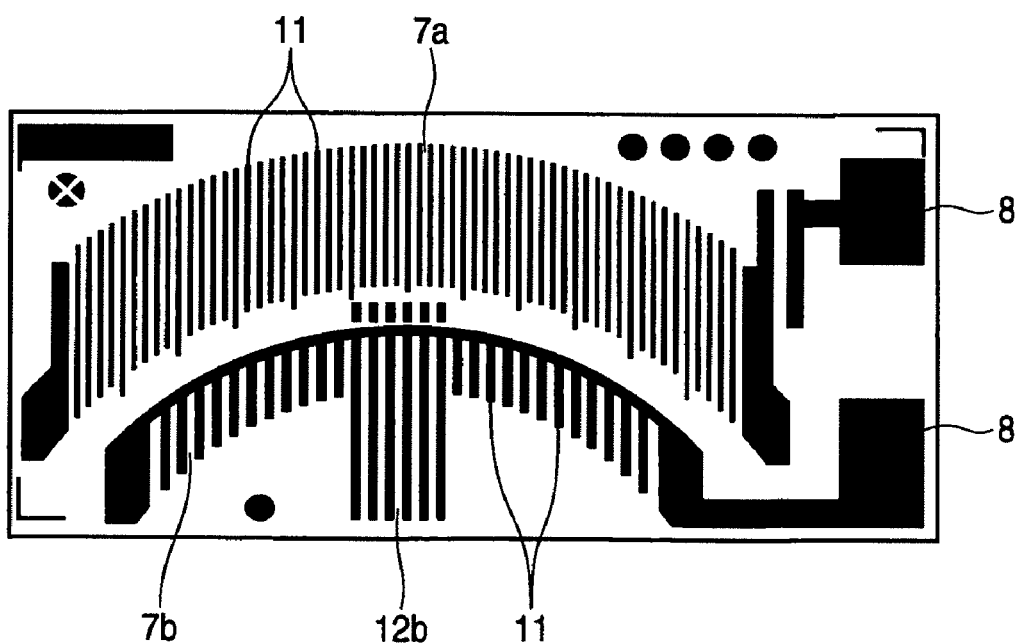
FIG. 5 is a plan view showing another modified wiring board of the liquid level detection apparatus of the invention.
Figure 6:
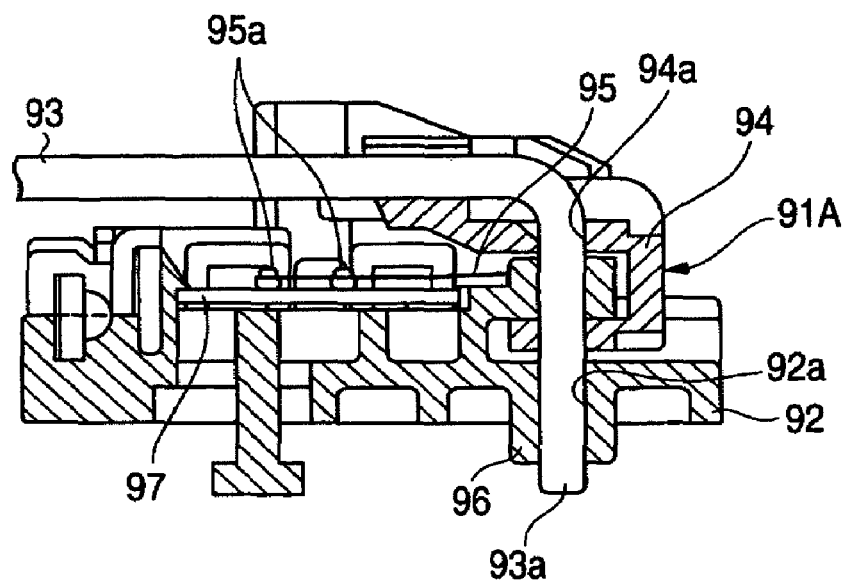
FIG. 6 is a cross-sectional view of a conventional liquid level detection apparatus.
Figure 7:
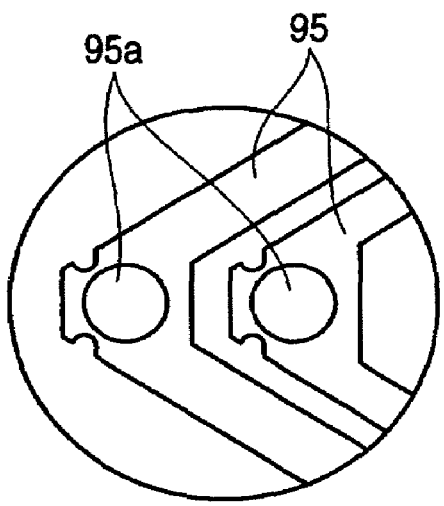
FIG. 7 is an enlarged view showing contacts of contact plates.
Figure 8:
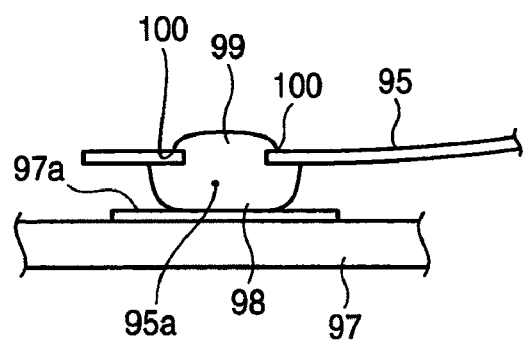
FIG. 8 is an end view of the contact of the contact plate of FIG. 7.
Figure 9:
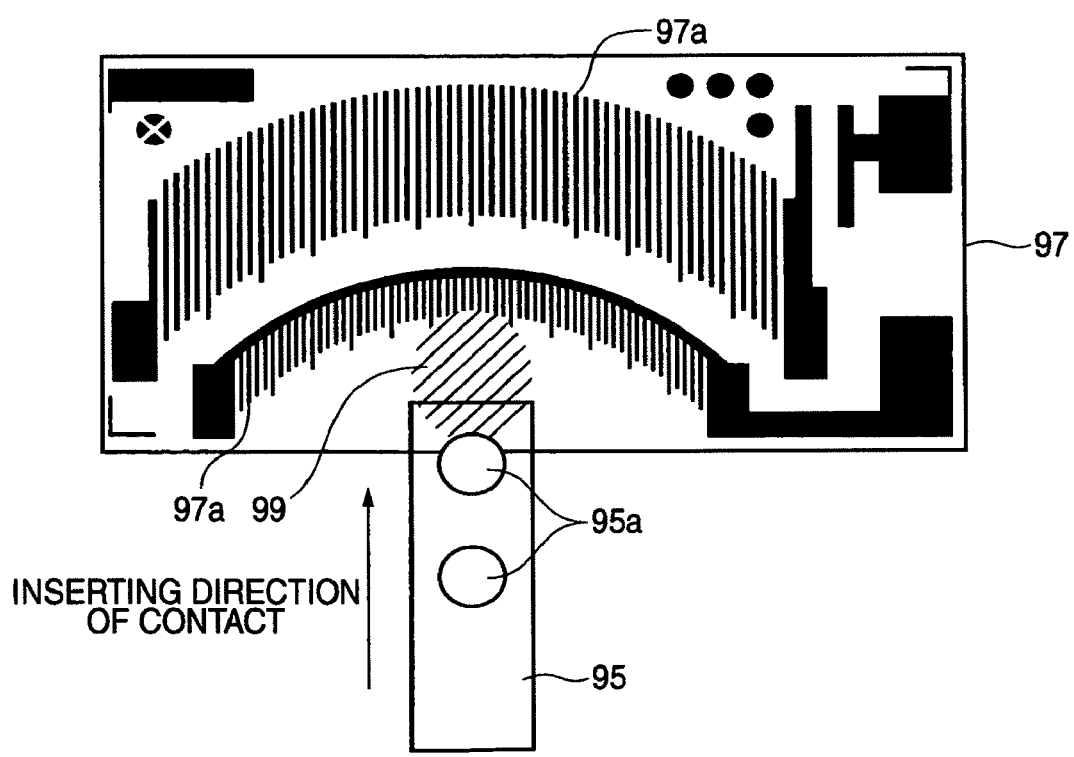
FIG. 9 is a plan view of a conventional wiring board.

FIGS. 4 and 5 show other embodiments of the invention which are similar to the embodiment of FIG. 3 except that different conductor patterns 12a and 12b are used. In FIG. 4, the conductor pattern 12a, 12b is formed such that stripe-like gaps in the conductor patterns 12a, 12b extend in a direction perpendicular to the inserting direction of the contacts 5a. In FIG. 5, the conductor pattern 12a, 12b is formed such that stripe-like gaps in the conductor pattern 12a, 12b extend in a direction parallel to the inserting direction of the contacts 5a.

Gap width of the gaps formed in the conductor patterns 12a, 12b, is set to be smaller than a predetermined width, such that the contacts 5a do not come into direct contact with the wiring board 7, when the arm holder 4 is mounted on the wiring board 7. In other words, the gap width is substantially smaller than the width of the contacts 5a.

The liquid level detection apparatus of the present invention is not limited to the above embodiments, and the material, shape, dimensions, form, disposition, etc., of the conductor patterns are not limited. The use of the liquid level detection apparatus of the invention is not limited to the automobile, and it can be applied, for example, to a railway vehicle, ship, various machine tools and so on.

What is claimed is:

1. An apparatus, comprising:
a float arm;
a contact which moves along a path when the float arm moves during a normal detection operation of the apparatus; and
a substrate that comprises a first conductor pattern and a second conductor pattern,
wherein the contact slidingly contacts the first conductor pattern as the contact moves along the path when the float arm moves during the normal detection operation,
wherein the contact does not contact the second conductor pattern as it moves along the path, and
wherein the second conductor pattern is configured to contact the contact during an assembly of the apparatus.

2. An apparatus according to claim 1, further comprising:
an arm holder that holds the float arm,
wherein the second conductor pattern is formed along an inserting direction of the contact when the arm holder is mounted with respect to the wiring board during the assembly of the apparatus.

3. An apparatus according to claim 1, wherein the normal detection operation comprises detecting a level of liquid.

4. An apparatus according to claim 1, wherein the second conductor pattern is formed along a direction in which the contact moves to position the contact relative to the substrate during the assembly of the apparatus.

* * * * *